(12) United States Patent
Katano et al.

(10) Patent No.: US 9,917,959 B2
(45) Date of Patent: Mar. 13, 2018

(54) SYSTEM, METHOD AND APPARATUS FOR MANAGING JOB PROCESSING BETWEEN A PROCESSING APPARATUS AND SERVER

(71) Applicant: CANON KABUSHIKI KAISHA, Tokyo (JP)

(72) Inventors: Kiyoshi Katano, Chiba (JP); Masao Maeda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/416,597

(22) Filed: Jan. 26, 2017

(65) Prior Publication Data

US 2017/0223200 A1 Aug. 3, 2017

(30) Foreign Application Priority Data

Jan. 29, 2016 (JP) ................................. 2016-016486

(51) Int. Cl.
*G06F 15/00* (2006.01)
*G06F 3/12* (2006.01)
*G06K 1/00* (2006.01)
*H04N 1/00* (2006.01)
*H04N 1/327* (2006.01)
*H04N 1/04* (2006.01)

(52) U.S. Cl.
CPC ..... *H04N 1/00228* (2013.01); *H04N 1/00204* (2013.01); *H04N 1/00344* (2013.01); *H04N 1/04* (2013.01); *H04N 1/32771* (2013.01); H04N 2201/0017 (2013.01); H04N 2201/0039 (2013.01); H04N 2201/0094 (2013.01); H04N 2201/3219 (2013.01); H04N 2201/3222 (2013.01)

(58) Field of Classification Search
CPC ........... H04N 1/00228; H04N 1/00204; H04N 1/00344; H04N 1/04; H04N 1/32771; H04N 2201/0017; H04N 2201/0039; H04N 2201/0094; H04N 2201/3219; H04N 2201/3222
USPC ....................................... 358/1.15, 1.1, 1.14
See application file for complete search history.

(56) References Cited

U.S. PATENT DOCUMENTS

| 2015/0002884 A1* | 1/2015 | Okumura | G06F 3/1203 358/1.14 |
| 2015/0070719 A1* | 3/2015 | Kuribara | G06F 3/1203 358/1.13 |

FOREIGN PATENT DOCUMENTS

| JP | 2003-288195 A | 10/2003 |
| JP | 2005-88301 A | 4/2005 |
| JP | 2015-5441 A | 1/2015 |

* cited by examiner

*Primary Examiner* — Douglas Tran
(74) *Attorney, Agent, or Firm* — Canon USA Inc., IP Division (57) ABSTRACT

A processing apparatus includes a reception unit configured to receive a job notification transmitted from a server, a control unit configured to store reception information indicating that the job notification is received in a memory, a request unit configured to request, in a case where the reception unit receives the job notification, the server to transmit job information, and an execution unit configured to execute the job using the job information transmitted from the server, in which the request unit requests the job information from the server in a case where the determination unit determines that the reception information is stored.

11 Claims, 9 Drawing Sheets

SYSTEM, METHOD AND APPARATUS FOR MANAGING JOB PROCESSING BETWEEN A PROCESSING APPARATUS AND SERVER

BACKGROUND OF THE INVENTION

Field of the Invention

The present invention relates to a processing system, a control method for the processing system, a processing apparatus, and a server.

Description of the Related Art

In recent years, with the spread of a cloud service, various services are provided by using a management server installed on the cloud service and a processing apparatus connected to the management server. For example, a cloud printing system is provided in which a printing job is transmitted from a terminal device of a user to a printing management server on the cloud service, and a printer obtains the printing job from the printing management server, so that printing can be performed. In the cloud printing system, a method for the printer to recognize that the printing job addressed to its own device exists in the printing management server includes, for example, a polling method and a push notification method. According to the polling method, the printer inquires the printing management server on the presence or absence of the printing job addressed to its own device at a predetermined time interval. According to the push notification method, when the printing management server accepts the printing job from the terminal device of the user, the printer is notified of the generation of the printing job. Subsequently, the printer that has received the notification obtains the job from the printing management server to perform printing. In a general cloud printing system, the push notification method is used in many cases from the viewpoints of a response time and communication traffic. However, according to the push notification method, after the push notification from the printing management server is received by the printer, a power supply of the printer may be cut off before job processing is completed in some cases. In this case, even when the power supply of the printer is turned on, the push notification from the printing management server is not received by the printer again, and the printer does not recognize the presence or absence of the job resulting in an issue where the job is not automatically obtained. In view of the above, Japanese Patent Laid-Open No. 2005-88301 discloses a printer technology for obtaining job information when the power supply of the printer is on even if the notification from the printing management server is not performed.

However, according to Japanese Patent Laid-Open No. 2005-88301, when the power supply of the printer is on, irrespective of whether or not the job addressed to its own device exists on the printing management server, a communication for the query needs to be performed with respect to the printing management server. However, if the communication for the query is performed each time the power supply of the printer is turned on, the traffic is increased, and server load is also generated. As a scale of the cloud printing system is further increased, this becomes more significant from the viewpoints of the traffic and the server load. It should be noted that this issue is not limited to the printing system constituted by the printer and the management server. The issue also similarly occurs in a processing system constituted by other types of processing apparatuses and management servers.

SUMMARY OF THE INVENTION

The present invention has been made to address the above-described issue and provides a processing system including a server and a processing apparatus in communication with the server. The server includes a first obtaining unit configured to obtain a job, a first control unit configured to store the obtained job and job notification information corresponding to the job in a first memory. A first notification unit is configured to perform, in a case where a communication connection between the processing apparatus and the server is established, job notification using the job notification information stored in the first memory. A first transmission unit is configured to transmit the job information in accordance with a request on the job information. The processing apparatus further includes a second reception unit configured to receive the job notification notified from the server and a second control unit configured to store reception information indicating that the job notification is received in a second memory. The server includes a determination unit configured to determine, in a case where a communication connection between the processing apparatus and the server is established, whether or not the reception information is stored in the second memory. A request unit is configured to request, in a case where the second reception unit receives the job notification, the server to transmit the job information. An execution unit is configured to execute the job using the job information transmitted from the first transmission unit, in which the request unit requests the server to transmits the job information in a case where the determination unit determines that the reception information is stored, and the second control unit restores, in a case where the execution unit completes executing the job, the reception information related to the completed job in the second memory to an initial state.

Further features of the present invention will become apparent from the following description of exemplary embodiments with reference to the attached drawings.

BRIEF DESCRIPTION OF THE DRAWINGS

FIG. 8 is a sequence chart in a case where a job is input from the terminal device in a state in which the power supply of the MFP is on.

FIG. 9 is a sequence chart in a case where a job is input from the terminal device in a state in which the power supply of the MFP is off, and thereafter the power supply of the MFP is turned on.

DESCRIPTION OF THE EMBODIMENTS

First Exemplary Embodiment

Hereinafter, exemplary embodiments of the present invention will be described in detail. It should be noted that components described in the exemplary embodiments illustrate modes as examples of the present invention, and the scope of the invention is not intended to be limited to these components.

Figure 1:
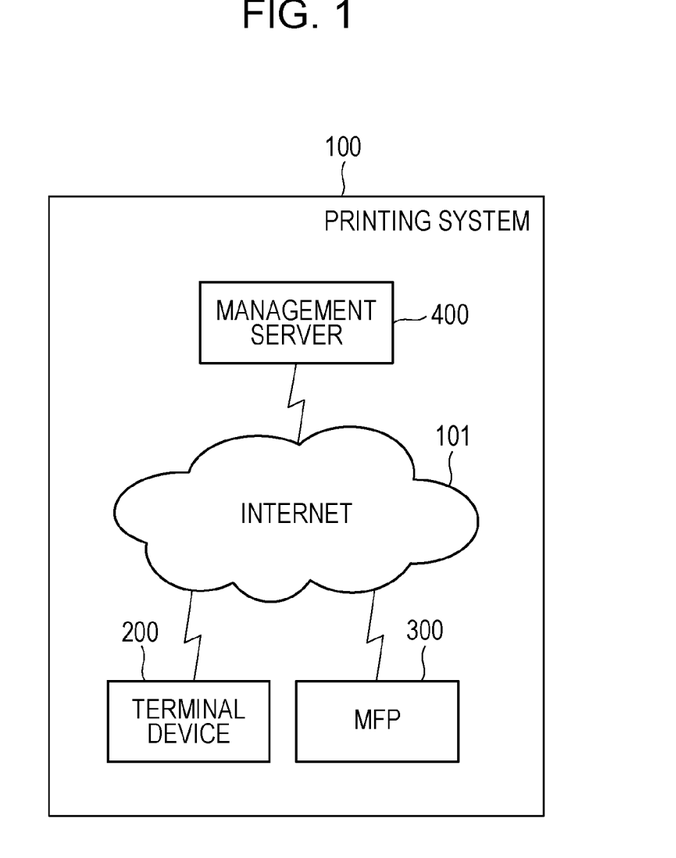
FIG. 1 illustrates a configuration of a printing system.

With reference to FIG. 1, descriptions will be given while using a printing system as an example of a processing system according to an exemplary embodiment of the present invention. FIG. 1 illustrates a configuration of a printing system 100. In the printing system 100, a terminal device 200, a multi-function printer 300 (hereinafter, will be also referred to as an MFP 300), and a management server 400 are connected to one another via the internet 101. The terminal device 200 and the MFP 300 may be connected to be communicable to each other on the same LAN or connected to be communicable to each other via the internet 101 as illustrated in FIG. 1. In a case where the terminal device 200 and the MFP 300 are connected to each other via the internet 101, the terminal device 200 and the MFP 300 can be installed in remote locations to be used. A related-art method such as a method of using a wired LAN, a wireless LAN, or a mobile phone line can be used for the configuration in which the respective devices including the terminal device 200, the MFP 300, and the management server 400 are connected to the internet 101.

According to the present exemplary embodiment, the management server 400 and the MFP 300 mutually establish an XMPP connection, and the management server 400 notifies the MFP 300 of a job generation by using an XMPP message (hereinafter, will be also referred to as a job notification). It should be noted that, according to the present exemplary embodiment, the XMPP connection is used as a communication connection between the management server 400 and the MFP 300, but the communication connection is not limited to this. The communication connection may be established by using other protocols.

It should be noted that, although the detail will be described below, according to the present exemplary embodiment, when the job is generated, in other words, when the management server 400 receives the job, job notification information is saved in a queue that is not illustrated in the drawing of the management server 400. Herein, the queue exists for each of the MFPs 300 that receive the job notification information. When the XMPP connection with the targeted MFP 300 that processes the job is established, the job notification is transmitted to the targeted MFP 300 and deleted from the queue. Subsequently, the MFP 300 that has received the job notification sets a flag, and in a case where the job corresponding to the job notification is executed, the flag is cleared. The MFP 300 determines whether or not the job information request is transmitted to the management server 400 depending on whether or not the flag is set.

Figure 2A:
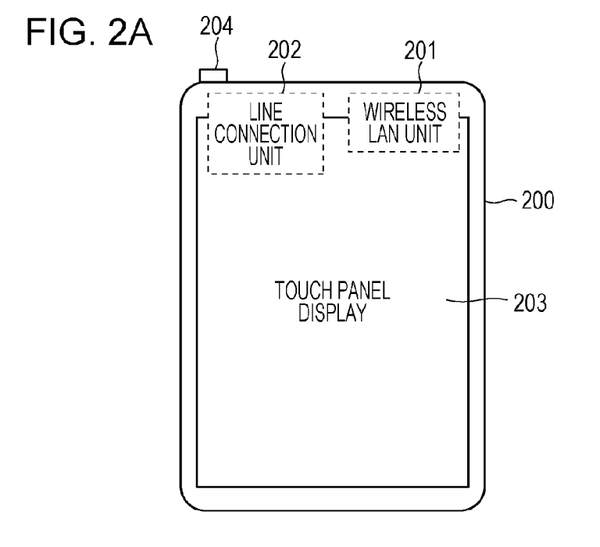
FIGS. 2A and 2B are explanatory diagrams for describing a terminal device.
Figure 2B:
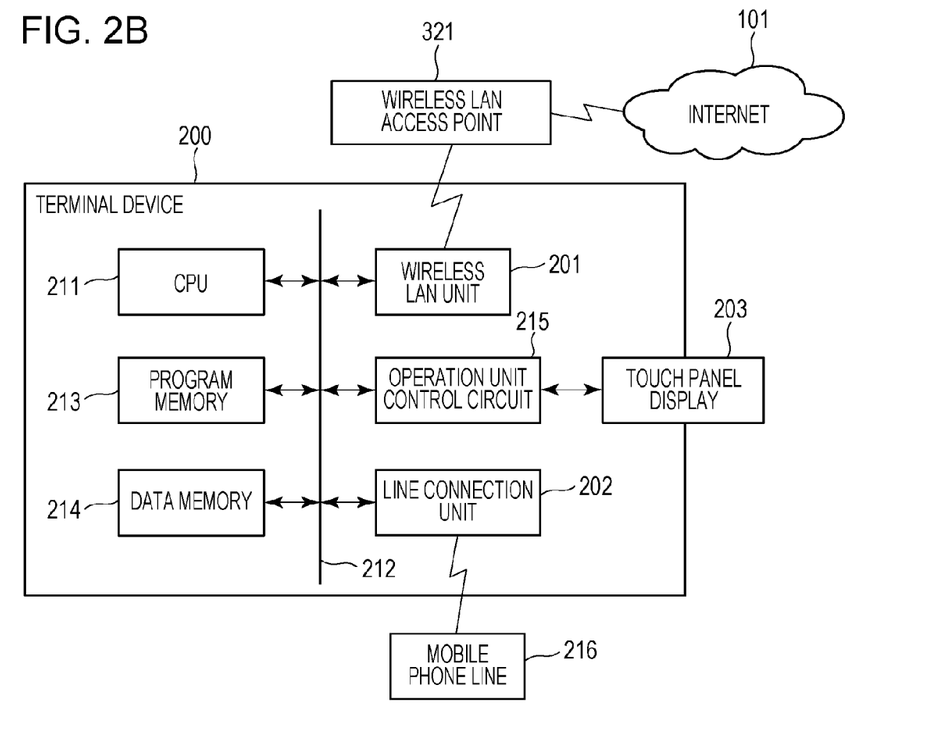

FIGS. 2A and 2B illustrate the terminal device 200. FIG. 2A is a conceptual diagram of the terminal device, and FIG. 2B is a block diagram illustrating a hardware configuration of the terminal device. The terminal device includes, for example, a tablet, a smart phone, a personal computer (PC), and other electronic devices. According to the present exemplary embodiment, descriptions will be given by using the smart phone as an example of the terminal device. The smart phone refers to a multi-function type mobile phone provided with a camera function, a net browser function, a mail function, and the like in addition to a phone function. As illustrated in FIG. 2A, the terminal device 200 includes a wireless LAN unit 201, a line connection unit 202, a touch panel display 203, and a power supply button 204. The wireless LAN unit 201 is a unit configured to perform a communication by way of a wireless LAN and is arranged in the device. The line connection unit 202 is a unit configured to perform a communication while being connected to a mobile phone line and is arranged in the device. The touch panel display 203 is an example of a display unit of the terminal device. According to the present exemplary embodiment, the touch panel display 203 is provided with both an LCD style display mechanism and a touch panel style operation mechanism and is arranged on a front face of the terminal device 200. The terminal device 200 displays button-like operation parts on the touch panel display 203, and an event corresponding to the pressed button is issued while a user performs a touch operation onto the touch panel display 203. That is, the terminal device 200 executes processing corresponding to the pressed button. Turning on and off of a power supply of the terminal device 200 is executed by the user operation of the power supply button 204.

FIG. 2B is a block diagram illustrating a configuration of a control system of the terminal device 200. The smart phone functioning as the terminal device 200 includes a CPU 211, a program memory 213, a data memory 214, the wireless LAN unit 201, an operation unit control circuit 215, and the line connection unit 202 which are mutually connected via an internal bus 212. The CPU 211 of a microprocessor mode performs various calculations and controls the entirety of the terminal device 200. The CPU 211 operates in accordance with a control program stored in the program memory 213 connected via the internal bus 212 and a content of the data memory 214. It should be noted that the program memory 213 is, for example, a ROM, and the data memory 214 is, for example, a RAM.

In addition, the wireless LAN unit 201 functions as an interface for the wireless LAN communication. The CPU 211 controls the wireless LAN unit 201 to be connected to a wireless LAN access point 321 provided in the outside. The wireless LAN access point 321 is connected to the internet 101. The CPU 211 of the terminal device 200 is connected to the internet via the wireless LAN access point 321 and can perform a communication with another device (external device).

The operation unit control circuit 215 is a circuit configured to control display of the touch panel display 203 functioning as a display unit and also control an acceptance of the user operation. The CPU 211 controls the operation unit control circuit 215, so that it is possible to display a state of the terminal device 200 and a function selection menu on the touch panel display 203 and accept the operation from the user. The line connection unit 202 is a unit configured to establish a connection to a mobile phone line 216. The CPU 211 controls the line connection unit 202 to be connected to the mobile phone line 216.

Furthermore, although not illustrated in the drawing, the terminal device 200 includes a camera unit, a mail unit, and the like.

In the terminal device 200, a printing instruction is performed with respect to the management server 400. At this time, image data may be transmitted. For example, the image data on an image server may be selected and transmitted from the image server. It should be noted that the job is input to the management server 400 in response to this printing instruction.

Figure 3A:
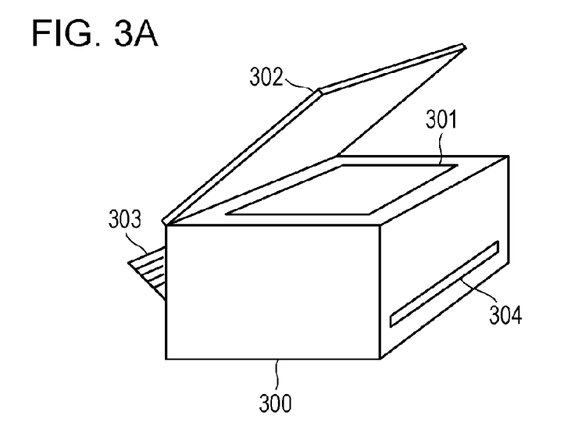
FIGS. 3A and 3B illustrate an MFP.
Figure 3B:
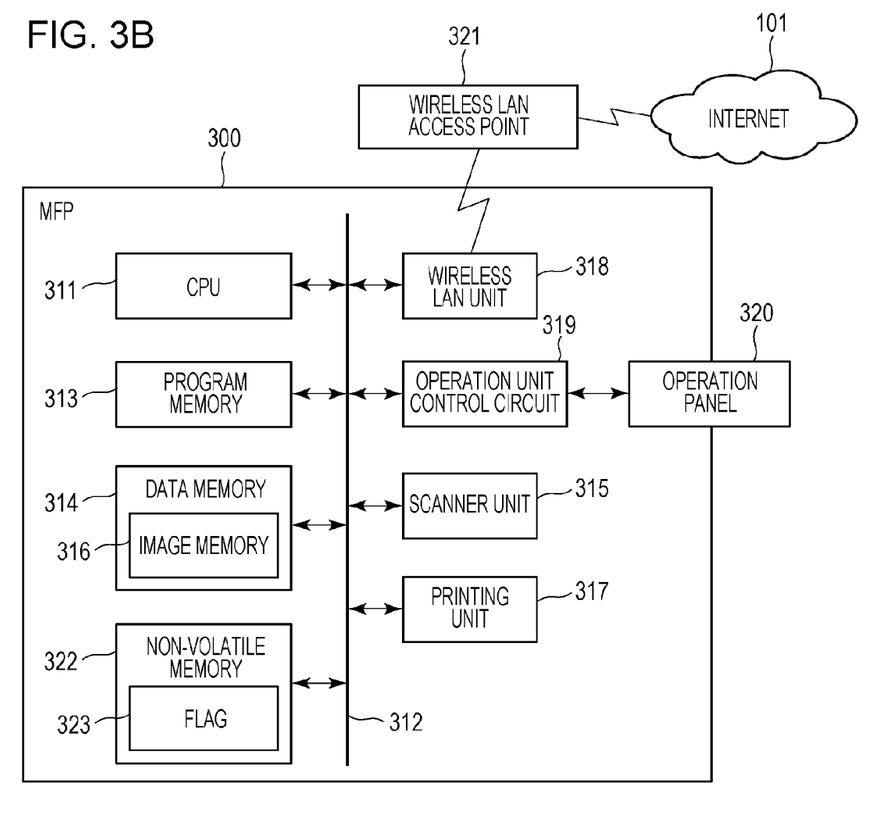

FIGS. 3A and 3B illustrate the MFP 300. FIG. 3A is a conceptual diagram of the MFP, and FIG. 3B is a block diagram illustrating a hardware of the MFP. According to the present exemplary embodiment, descriptions will be given while using a multi-function printer (MFP) provided with both a printing function and a scanner function corresponding to an example of the processing apparatus as an example. It should be noted that the MFP may be further provided with other functions. In addition, the processing apparatus is not limited to the MFP. For example, a single function printer provided with only the printing function, a single function scanner provided with only the scanner function, a network camera, or the like can also be used.

As illustrated in FIG. 3A, the MFP 300 includes a platen glass 301, a platen glass pressure plate 302, a printing sheet insertion slot 303, and a printing sheet discharge slot 304. The platen glass 301 is a glass-like transparent table on which the original is placed when the scanner reads the original. The platen glass pressure plate 302 is a cover that presses the original against the platen glass so that the original does not float and also external light does not enter the scanner unit when the scanner performs the reading. The printing sheet insertion slot 303 is an insertion slot for setting sheets of various sizes and is arranged on a back face of a main body according to the present exemplary embodiment. Each of the sheets set here is conveyed to the printing unit and discharged from the printing sheet discharge slot 304 after a desired image is printed.

FIG. 3B is a block diagram illustrating a configuration of a control system of the MFP 300. The MFP 300 includes a CPU 311, a program memory 313, a data memory 314, a wireless LAN unit 318, an operation unit control circuit 319, a scanner unit 315, a printing unit 317, and a non-volatile memory 322. These components are mutually connected via an internal bus 312. The CPU 311 of a microprocessor mode performs various calculations and controls the entirety of the MFP 300. The CPU 311 operates in accordance with a control program stored in the program memory 313 connected via the internal bus 312 and a content of the data memory 314. It should be noted that the program memory 313 is, for example, a ROM, and the data memory 314 is, for example, a RAM. The CPU 311 stores information that is to be stored even in a case where the power supply is interrupted in the non-volatile memory 322. The non-volatile memory 322 is, for example, a flash ROM. The non-volatile memory 322 stores information of a flag 323. A state in which the flag 323 is set (in the case of the flag=1) indicates that the job notified from the management server 400 exists. A state in which the flag 323 is cleared (flag=0) indicates that the notified job does not exist. In an initial state, the flag 323 is set in the cleared state. Therefore, the flag 323 can be regarded as reception information indicating that the notification of the job is received and can also be regarded as information indicating that the job to be processed by the MFP 300 exists in the management server 400.

The scanner unit 315 is a unit configured to read the original, and the printing unit 317 is a unit configured to print the image on the recording medium. The CPU 311 controls the scanner unit 315 to read the original and generates the image data. The CPU 311 stores the generated image data in an image memory 316 in the data memory 314. In addition, the CPU 311 controls the printing unit 317 and can print the image on the recording medium on the basis of the image data in the image memory 316 in the data memory 314.

The wireless LAN unit 318 also functions as an interface for the wireless LAN communication. The CPU 311 controls the wireless LAN unit 318 to establish a connection to the wireless LAN access point 321 installed in the outside. The wireless LAN access point 321 is connected to the internet 101. The CPU 311 of the MFP 300 is connected to the internet via the wireless LAN access point 321 and can perform a communication with another device (external device).

The operation unit control circuit 319 is a circuit configured to control display of an operation panel 320 functioning as a display unit and also control an acceptance of the user operation. The CPU 311 controls the operation unit control circuit 319, so that it is possible to display a state of the MFP 300 and a function selection menu on the operation panel 320 provided on an outer face of the MFP 300 and accept the operation from the user.

While the above-described configurations are combined with each other, the MFP 300 provides various functions to the user. For example, the printing job is obtained from the management server 400 connected via the internet 101, and the printing unit 317 is controlled, so that an image can be printed on a recording medium. In addition, image data generated by controlling the scanner unit 315 to read an original can be transmitted to the management server 400 or another device. Furthermore, the various operations of the MFP 300 can be executed in response to the user input onto the operation panel 320. For example, it is possible to execute a copying function while the scanner unit 315 is controlled to read the original, and the read image is printed on the printing unit 317.

Figure 4:
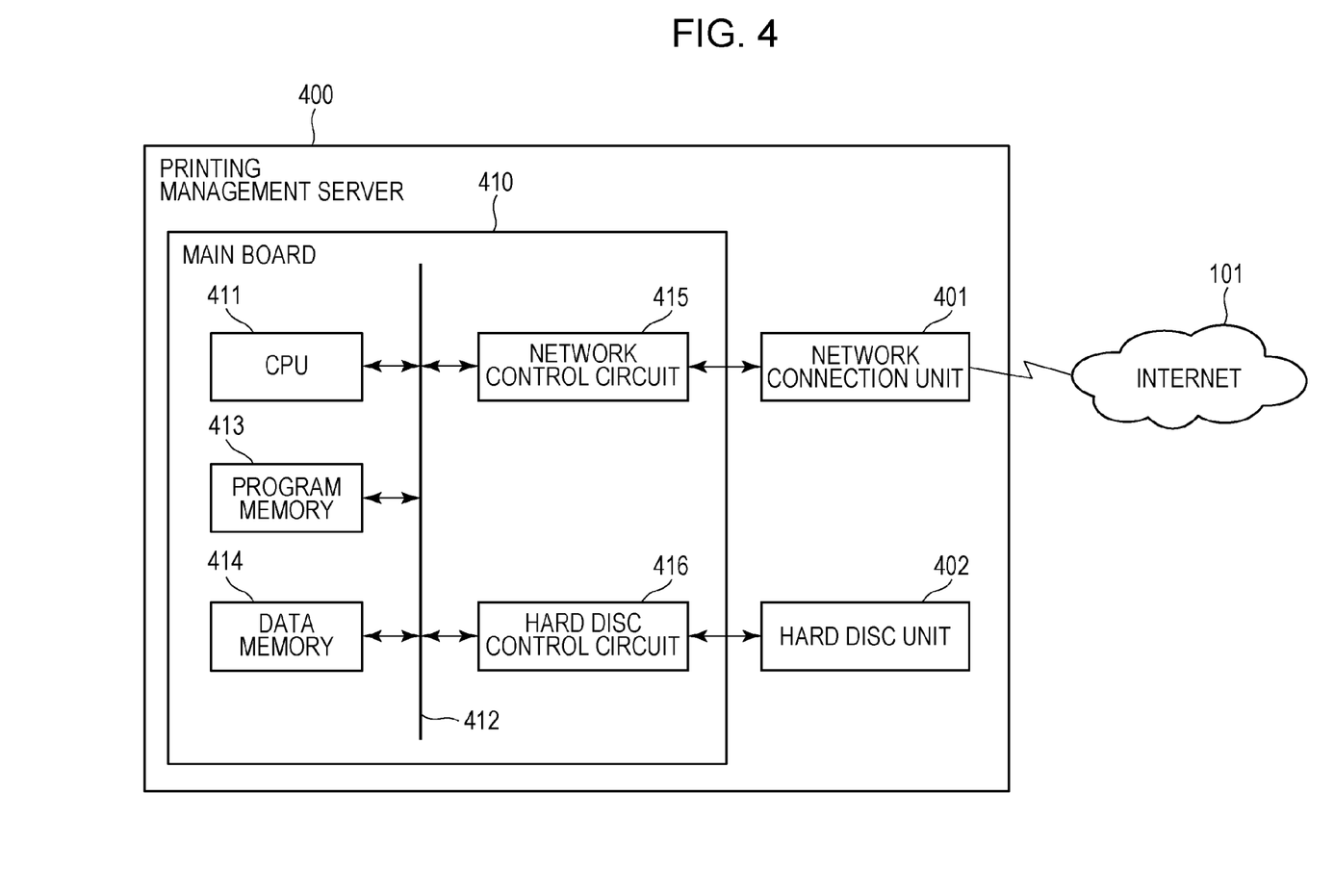
FIG. 4 is a block diagram illustrating a configuration of a control system of a management server.

FIG. 4 is a block diagram illustrating a configuration of a control system of the management server 400. The management server 400 includes a main board 410 that controls the entire device, a network connection unit 401, and a hard disc unit 402. The main board 410 includes a CPU 411, a program memory 413, a data memory 414, a network control circuit 415, and a hard disc control circuit 416, and these components are mutually connected via an internal bus 412. The CPU 411 of a microprocessor mode operates in accordance with a control program stored in the program memory 413 connected via the internal bus 412 and a content of the data memory 414. It should be noted that the program memory 313 is, for example, a ROM, and the data memory 314 is, for example, a RAM. The CPU 411 controls the network connection unit 401 via the network control circuit 415 to be connected to the internet 101 and can perform a communication with another device (external device). The CPU 411 can write data to and read data from the hard disc unit 402 connected via the hard disc control circuit 416. The hard disc unit 402 stores an operating system loaded onto the program memory 413 to be used, control software of the management server 400, and other various pieces of data. The data of the printing job received from the terminal device 200 is discriminated for each of the MFPs 300 that are to execute the printing job and is stored in the hard disc unit 402. The queue for the job notification transmitted to each of the MFPs 300 is also stored in the hard disc unit 402. Herein, the job notification refers to a notification of information indicating that the job has been generated.

Figure 5:
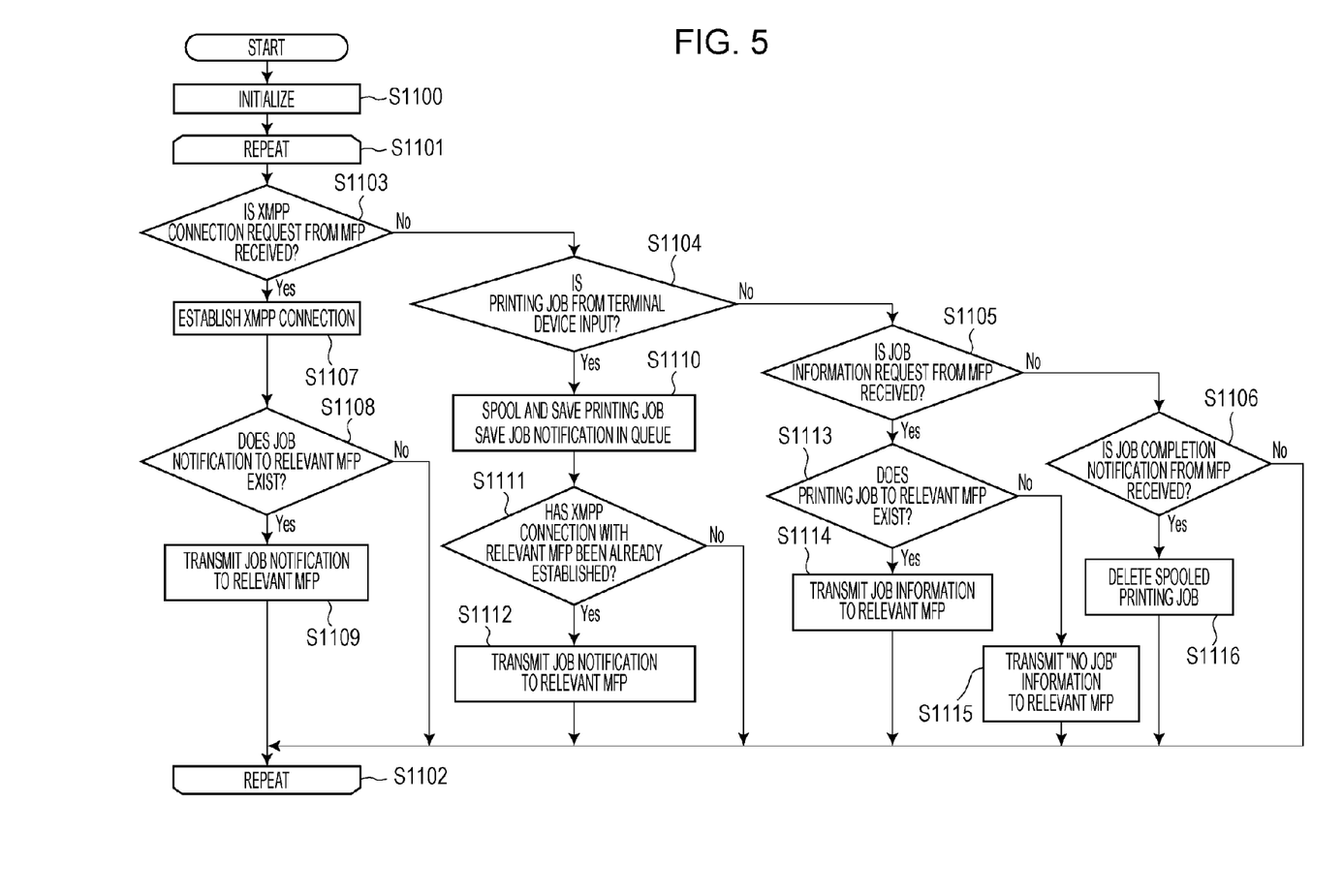
FIG. 5 is a flow chart illustrating a processing content of the management server.

FIG. 5 is a flow chart illustrating a processing content of the CPU 411 of the management server 400. Execution of the processing of the present flow chart is started when the management server 400 is activated to activate the control program of the management server 400. First, various initialization processes of the program for controlling the management server 400 are performed in step S1100. Thereafter, the flow enters a repeating loop from step S1101 to step S1102. In this repeating loop, various events received from the outside in the respective steps from step S1103 to step S1106 are detected, and processing corresponding to each of the events is performed.

In a case where a reception of an XMPP connection request from the MFP 300 is detected as an event in step S1103, the flow proceeds to step S1107, and XMPP connection establishment processing with the relevant MFP 300 is performed. Subsequently, the flow proceeds to step S1108, and it is determined whether or not the job notification to the relevant MFP 300 (the MFP 300 that has requested the connection) exists. At this time, it is determined whether or not the printing job of which the relevant MFP 300 is to be notified is saved in a queue corresponding to the relevant MFP 300 (hereinafter, will be also referred to as a "relevant queue"). When it is determined that the job notification to the relevant MFP 300 exists, that is, the printing job notification to the relevant MFP 300 is saved in the queue, the flow proceeds to step S1109, and the job notification is transmitted to the relevant MFP 300. At this time, the job notification corresponding to the relevant printing job is deleted from the relevant queue. On the other hand, in step S1108, in a case where the job notification does not exist in the relevant queue, that is, the printing job notification to the relevant MFP 300 does not exist, the job notification to the relevant MFP 300 is not transmitted.

In a case where an input of the printing job from the terminal device 200 is detected as an event in step S1104 (S1104: Yes), the flow proceeds to step S1110, and the printing job is spooled in the hard disc unit 402. At this time, the job notification information is saved in the relevant queue. It should be noted that the job notification information refers to information indicating that the job notification exists. Subsequently, in step S1111, the MFP 300 is identified which is to execute the input printing job on the basis of the input printing job, and it is determined whether or not the XMPP connection with the relevant MFP 300 has been already established. In a case where the XMPP connection has been already established (S1111: Yes), the flow proceeds to step S1112, and a message of the job notification is transmitted to the relevant MFP 300 by using an XMPP connection channel. At this time, the job notification corresponding to the relevant printing job is deleted from the relevant queue. On the other hand, in step S1111, in a case where the XMPP connection has not been already established (S1111: No), the job notification to the MFP 300 is not performed.

In a case where a reception of a job information request from the MFP 300 is detected as an event in step S1105, the flow proceeds to step S1113. In step S1113, the relevant MFP 300 is identified, and it is determined whether or not the printing job that is to be executed by the relevant MFP 300 is spooled and saved in the hard disc unit 402. When it is determined that the printing job to the relevant MFP 300 is spooled and saved (S1113: Yes), the flow proceeds to step S1114, and the printing job information is transmitted to the relevant MFP 300. Herein, the "printing job information" refers to printing job data and specifically includes printing data for printing the image and information of printing settings such as a printing quality and a sheet size. When it is determined in step S1113 that the printing job to the relevant MFP 300 does not exist (S1113: No), the flow proceeds to step S1115, and information indicating "no printing job" is transmitted to the MFP 300 as a reply to the relevant MFP 300.

Figure 6:
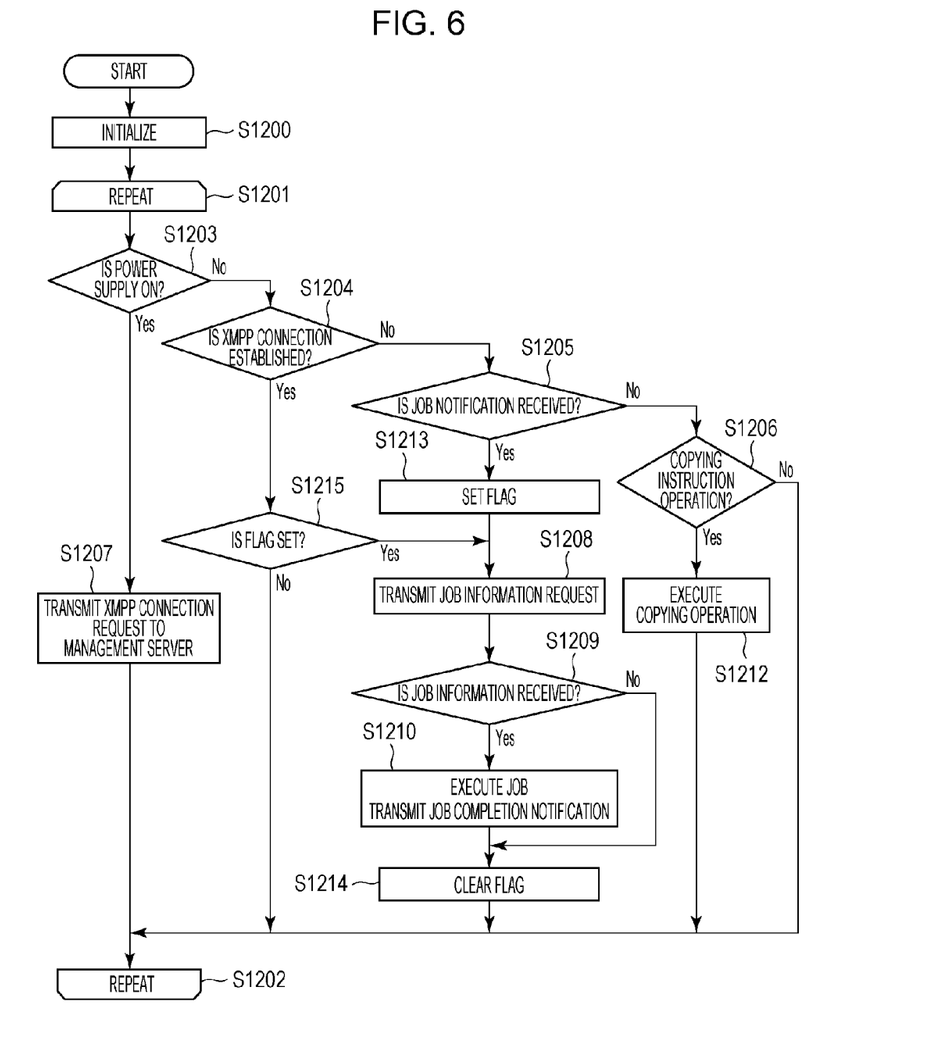
FIG. 6 is a flow chart illustrating a processing content of the MFP.

In a case where a reception of the job completion notification from the MFP 300 is detected as an event in step S1106 (S1106: Yes), the flow proceeds to step S1116. In step S1116, the relevant printing job is identified, and the relevant printing job spooled and saved in the hard disc unit 402 is deleted. It should be noted that, in a case where any event is not detected, that is, a case where the reception of the job completion notification from the MFP 300 is not detected as an event in step S1106 (S1106: No), the flow directly proceeds to S1102. FIG. 6 is a flow chart illustrating a processing content of the CPU 311 of the MFP 300. Execution of the processing of the present flow chart is started when the MFP 300 is connected to an alternating current (AC) power supply, and the control program of the MFP 300 is activated. In a stage where the control program is activated, the MFP 300 is connected to the AC power supply but is apparently in a power supply off state, and is in a so-called standby state in which power consumption is particularly low. The CPU 311 performs various initialization processes of the MFP 300 in step S1200. Thereafter, the flow enters a repeating loop from step S1201 to step S1202. In this repeating loop, various events received from the outside in the respective steps from step S1203 to step S1206 are detected, and processing corresponding to each of the events is performed.

In a case where a power supply on operation performed in response to an operation onto the operation panel 320 of the MFP 300 is detected as an event in step S1203 (S1203: Yes), the flow proceeds to step S1207. In step S1207, the XMPP connection request is transmitted to the management server 400. When the management server 400 performs the XMPP connection establishment processing in response to this XMPP connection request, the XMPP connection between the MFP 300 and the management server 400 is established, and the event of the establishment of the XMPP connection is detected.

In a case where the establishment of the XMPP connection with the management server 400 is detected as an event in step S1204, it is determined whether or not the flag 323 is set in step S1215. That is, the CPU 311 checks whether or not the flag 323 is set in the non-volatile memory 322. When it is determined that the flag 323 is not set (S1215: No), that is, in a case where the flag 323 is not set and is cleared, no particular processing such as the communication to the management server 400 is performed while only checking the establishment of the XMPP connection. When it is determined that the flag 323 is set (S1215: Yes), the flow proceeds to step S1208.

In step S1208, the CPU 311 transmits the job information request to the management server 400 and receives a reply to the request. That is, in S1208, a query on the job information is made. Subsequently, a content of the reply received in step S1209 is checked, and it is determined whether or not the job information addressed to its own device is received (S1209). When it is determined that the job information is received (S1209: Yes), the flow proceeds to step S1210, and printing of the received job is executed. Subsequently, when the job is completed, the job completion notification is transmitted to the management server 400. It should be noted that, in the job completion notification, a notification is performed with regard to the job where the execution is completed. However, after the job information is received, the job completion may be any of cases including a case where the operation is normally ended, a case where the operation is aborted because of an error occurrence, and a case where the operation is aborted by the user operation. Subsequently, after the job completion notification is transmitted, the flow proceeds to S1214. On the other hand, when it is determined that the job information is not received in step S1209, for example, in a case where a reply such as "no job" is received (S1209: No), the flow directly proceeds to step S1214, and the execution of the job is not performed. In step S1214, the CPU 311 clears the flag 323, and the flow proceeds to step S1202. In this step S1214, the flag is cleared with regard to the job where the job completion notification is transmitted (that is, the job where the execution is completed). With this configuration, reception information indicating that the job notification is received is restored to an initial state. On the other hand, the flag is not cleared with regard to a job other than the job where the job completion notification is transmitted.

In a case where a reception of the message of the job notification from the management server 400 by way of the XMPP connection is detected as an event in step S1205 (S1205: Yes), the flow proceeds to step S1213. In step S1213, the CPU 311 sets the flag 323, and the flow proceeds to step S1208. The CPU 311 transmits the job information request to the management server 400 and receives a reply to the request. That is, the job information is obtained from the management server 400, so that the job can be processed. Thereafter, the flow proceeds to S1209.

In a case where an operation for instructing execution of a copying operation by the user operation to the operation panel 320 is received as an event in step S1206 (S1206: Yes), the flow proceeds to step S1212, and the copying operation is executed. It should be noted that, in a case where any event is not detected, that is, a case where the operation for instructing the execution of the copying operation is not received as an event in step S1206 (S1206: No), the flow directly proceeds to S1202. Hereinafter, with reference to FIGS. 7 to 9, a flow of the processing of the printing system 100 as a whole will be described by way of sequence charts.

Figure 7:
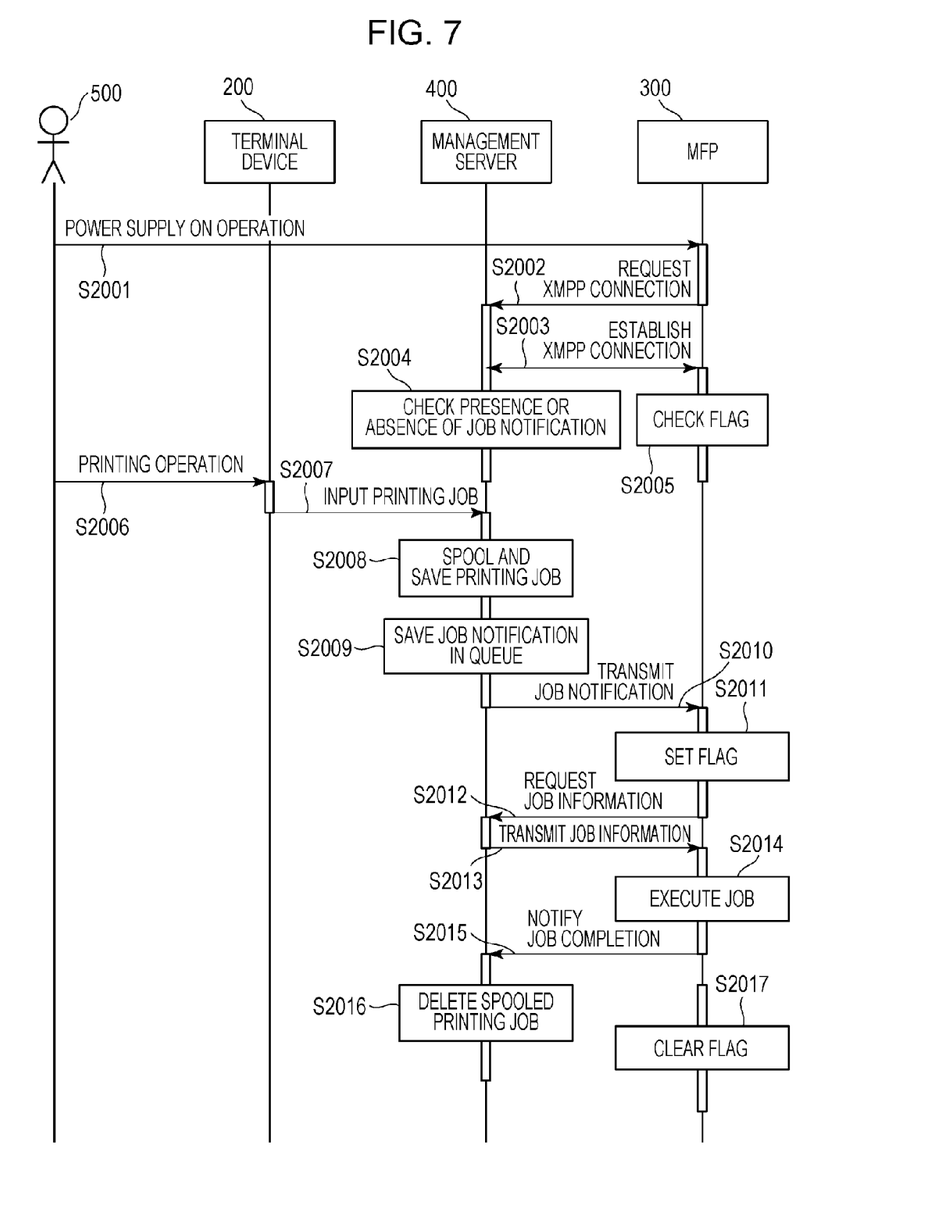
FIG. 7 is a sequence chart in a case where a power supply of the MFP is turned on in a state in which a job does not exist on a management server side.

FIG. 7 is a sequence chart in a case where the power supply of the MFP 300 is turned on in a state in which the flag 323 is cleared, and the printing job is input after the power supply is turned on. In step S2001, a user 500 operates the operation panel 320 of the MFP 300 to perform the power supply on operation of the MFP 300. When the MFP 300 receives (detects) the power supply on operation via the operation panel 320 (S1203 in FIG. 6: Yes), the processing with respect to the power supply on event is performed, and in step S2002, the XMPP connection request is performed with respect to the management server 400 (S1207 in FIG. 6). When the management server 400 receives the XMPP connection request (S1103 in FIG. 5: Yes), the XMPP connection processing is performed, and in step S2003, the XMPP connection between the management server 400 and the MFP 300 is established (S1107 in FIG. 5). When the XMPP connection is established, the management server 400 checks in step S2004 whether or not the job notification of which the relevant MFP 300 is to be notified is saved in the relevant queue (S1108 in FIG. 5). In the example illustrated in FIG. 7, since the job notification with respect to the relevant MFP 300 is not saved in the relevant queue (S1108 in FIG. 5: No), the transmission of the job notification is not performed with respect to the MFP 300. On the other hand, when the XMPP connection is established (S1204 in FIG. 6: Yes), in step S2005, the MFP 300 checks the flag 323. In this example, since the flag 323 is cleared (S1215 in FIG. 6: No), job query processing from the MFP 300 to the management server 400 is not performed. In step S2006, the user 500 operates the touch panel display 203 of the terminal device 200 to perform the printing instruction of the predetermined data. Specifically, in the terminal device 200, printing of the predetermined data is instructed by the MFP 300. When the terminal device 200 receives (detects) the printing instruction via the touch panel display 203, in step S2007, the printing job is transmitted to the management server 400. In response to this, in step S2008, the management server 400 spools and saves the printing job in its own hard disc unit 402 (S1104 in FIG. 5: Yes, S1110). At this time, the input printing job and the information (device information) for identifying the MFP 300 that is to execute this printing job are saved while being associated with each other. Furthermore, in step S2009, the management server 400 saves the job notification that is to be transmitted to the MFP 300 in the relevant queue. At this time, since the XMPP connection is established with the MFP 300 (S1111 in FIG. 5: Yes), in step S2010, the management server 400 transmits the job notification to the MFP 300 that is to execute the printing job (S1112 in FIG. 5). When the MFP 300 receives the job notification (S1205 in FIG. 6: Yes), in step S2011, the flag 323 is set (S1213 in FIG. 6). Subsequently, in step S2012, the MFP 300 transmits the job information request to the management server 400 (S1208 in FIG. 6).

When the management server 400 receives the job information request from the MFP 300 (S1105 in FIG. 5), in step S2013, the printing job data spooled and saved in the hard disc unit 402 is transmitted to the MFP 300 (S1114 in FIG. 5). In this example, this is because the printing job to the MFP 300 exists (S1113 in FIG. 5: Yes).

When the MFP 300 receives the job information (S1209 in FIG. 6: Yes), in step S2014, the execution of the printing job is performed (S1210 in FIG. 6). Subsequently, when the printing job is completed, in step S2015, the job completion notification is transmitted to the management server 400 (S1210 in FIG. 6). When the management server 400 receives the job completion notification (S1106 in FIG. 5: Yes), in S2016, the management server 400 deletes this printing job spooled and saved in the hard disc unit 402 (S1116 in FIG. 5). In addition, the job notification corresponding to the relevant printing job is deleted. After the printing job is completed, in step S2017, the MFP 300 clears the flag 323 (S1214 in FIG. 6). In a case where the printing job is completed as described above, the flag 323 is set in the cleared state.

Here, a case will be described where the plurality of printing jobs with respect to the relevant MFP 300 are spooled and saved. In step S2013, data of all the printing jobs may be transmitted as the job information, or data of part of the printing jobs may be transmitted. In step S2014, the MFP 300 performs control such that all the received printing jobs are continuously executed. It should be noted that, in a case where part of the data of the printing job is transmitted, for example, a case where the MFP 300 transmits the job completion notification and the job information request each time a single printing job is completed, control may be performed such that the printing job is continuously executed if the next printing job information exists.

Figure 8:
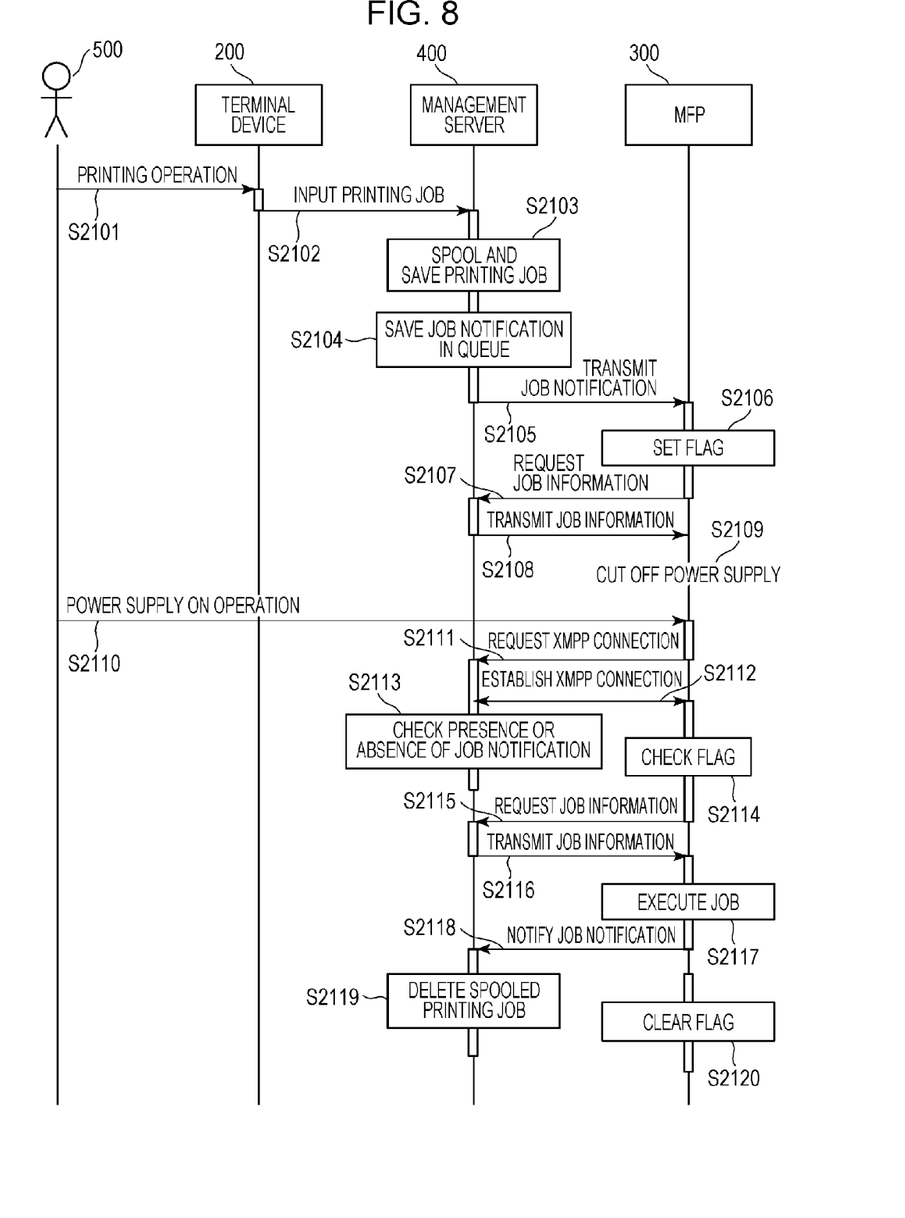

FIG. 8 is a sequence chart in a case where the job is input from the terminal device 200 when the MFP 300 is in the power supply on state, and thereafter the power supply of the MFP 300 is cut off and then is turned on again. In step S2101, the user 500 operates the touch panel display 203 of the terminal device 200 to perform the printing instruction of the predetermined data. When the terminal device 200 receives (detects) the printing instruction via the touch panel display 203, in step S2102, the printing job is transmitted to the management server 400. In response to this, in step S2103, the management server 400 spools and saves the printing job in its own hard disc unit 402 (S1104 in FIG. 5: Yes, S1110). At this time, the input printing job and the information (device information) for identifying the MFP 300 that is to execute this printing job are saved while being associated with each other. Furthermore, in step S2104, the job notification that is to be transmitted to the MFP 300 is saved in the relevant queue (S1110 in FIG. 5). At this time, since the XMPP connection is established with the MFP 300 (S1111 in FIG. 5: Yes), in step S2105, the management server 400 transmits the job notification to the MFP 300 that is to execute the printing job (S1112 in FIG. 5). In contrast to this, when the MFP 300 receives the job notification (S1205 in FIG. 6: Yes), in step S2106, the flag 323 is set (S1213 in FIG. 6). Subsequently, in step S2107, the MFP 300 transmits the job information request to the management server 400 (S1208 in FIG. 6). When the management server 400 receives the job information request from the MFP 300 (S1105 in FIG. 5), in step S2108, the printing job data spooled and saved in the hard disc unit 402 is transmitted to the MFP 300 (S1114 in FIG. 5). Herein, this is because the printing job to the MFP 300 exists (S1113 in FIG. 5: Yes).

Here, a case where the power supply of the MFP 300 is cut off as step S2109 will be described. Since the power supply is cut off, the processing ends while the MFP 300 does not receive the job information. In this case, the MFP 300 is in the power supply off state while the flag 323 remains set. Subsequently, since the management server 400 does not receive the job completion notification, the job notification is transmitted to the MFP 300 (in this example, the job information is further transmitted), but the job where the printing execution is not yet completed remains. It should be noted that, in this example, the job information is transmitted from the management server 400, but the MFP 300 does not receive the job information. Thereafter, when the power supply of the MFP 300 is turned on in a state in which the flag 323 is set, according to the present exemplary embodiment, the MFP 300 can obtain the printing job from the management server 400. Hereinafter, the process will be specifically described.

In step S2110, the user 500 operates the operation panel 320 of the MFP 300 to perform the power supply on operation of the MFP 300. When the MFP 300 receives (detects) the power supply on operation via the operation panel 320 (S1203 in FIG. 6: Yes), the processing with respect to the power supply on event is performed, and in step S2111, the XMPP connection request is performed with respect to the management server 400 (S1207 in FIG. 6). When the management server 400 receives the XMPP connection request (S1103 in FIG. 5: Yes), the XMPP connection processing is performed, and in step S2112, the XMPP connection between the management server 400 and the MFP 300 is established (S1107 in FIG. 5). When the XMPP connection is established, in step S2113, the management server 400 determines whether or not the job notification of which the relevant MFP 300 is to be notified is saved in the queue (S1108 in FIG. 5). In this example, since the job notification with respect to the relevant MFP 300 is not saved in the queue (S1108 in FIG. 5: No), the transmission of the job notification is not performed with respect to the MFP 300. On the other hand, when the XMPP connection is established (S1204 in FIG. 6: Yes), in step S2114, the MFP 300 checks the flag 323 (S1215 in FIG. 6). In this example, since the flag 323 is set (S1215 in FIG. 6: Yes), the job information request is transmitted to the management server 400 in step S2115 (S1208 in FIG. 6). When the job information request is received (S1105 in FIG. 5: Yes), in step S2116, the management server 400 transmits the printing job data spooled and saved in the hard disc unit 402 to the MFP 300 (S1114 in FIG. 5). In this example, this is because the printing job with respect to the MFP 300 is saved (S1113 in FIG. 5: Yes). When the MFP 300 receives the job information (S1209 in FIG. 6: Yes), in step S2117, the execution of the printing job is performed (S1210 in FIG. 6). Subsequently, when the printing job is completed, in step S2118, the job completion notification is transmitted to the management server 400 (S1210 in FIG. 6). When the job completion notification is received (S1106 in FIG. 5: Yes), in step S2119, the management server 400 deletes this printing job spooled and saved in the hard disc unit 402 (S1116 in FIG. 5). After the execution of the printing job is completed, in step S2120, the MFP 300 clears the flag 323 (S1214 in FIG. 6).

As described above, according to the present exemplary embodiment, the flag 323 is set in the cleared state in a case where the printing job is normally completed. It should be noted that, in a case where the power supply is turned on in a state in which the flag 323 is set, the job completion notification may be transmitted while it is assumed that an error end occurs without executing the obtained job. In this case, when a notification of the error end is issued, the management server 400 deletes this printing job spooled and saved in the hard disc unit 402.

Figure 9:
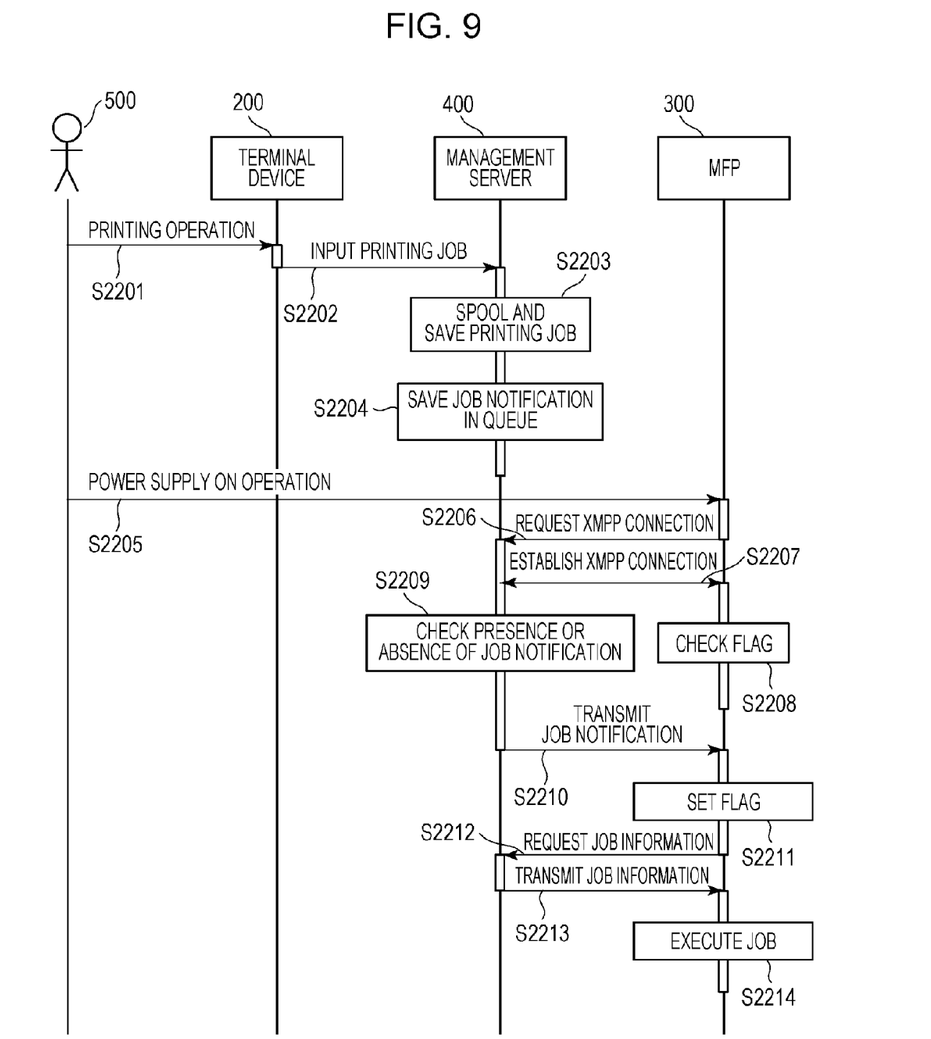

FIG. 9 is a sequence chart in a case where the job is input from a client terminal when the MFP 300 is in the power supply off state, and thereafter the power supply of the MFP 300 is turned on. A state is established in which the power supply of the MFP 300 is normally turned off, and the flag 323 is cleared. In step S2201, the user 500 operates the touch panel display 203 of the terminal device 200 to perform the printing instruction of the predetermined data. When the terminal device 200 receives (detects) the printing instruction via the touch panel display 203, in step S2202, the printing job is transmitted to the management server 400. In response to this, in step S2203, the management server 400 spools and saves the printing job in its own hard disc unit 402 (S1104 in FIG. 5: Yes, S1110). At this time, the input printing job and the information (device information) for identifying the MFP 300 that is to execute this printing job are saved while being associated with each other. Furthermore, in step S2204, the job notification that is to be transmitted to the MFP 300 is saved in the relevant queue. Herein, since the management server 400 is in a state in which the XMPP connection with the MFP 300 is not established (S1111 in FIG. 5: No), the job notification to the MFP 300 is not transmitted at this time. Subsequently, in step S2205, the user 500 operates the operation panel 320 of the MFP 300 to perform the power supply on operation of the MFP 300. When the MFP 300 receives (detects) the power supply on operation via the operation panel 320 (S1203 in FIG. 6: Yes), the processing with respect to the power supply on event is performed, and in step S2206, the XMPP connection request is performed with respect to the management server 400 (S1207 in FIG. 6). When the management server 400 receives the XMPP connection request (S1103 in FIG. 5: Yes), the XMPP connection processing is performed, and in step S2207, the XMPP connection between the management server 400 and the MFP 300 is established (S1107 in FIG. 5). When the XMPP connection is established (S1204 in FIG. 6: Yes), in step S2208, the MFP 300 checks the flag 323 (S1215 in FIG. 6). In this example, since the flag 323 is cleared (S1215 in FIG. 6: No), the job query processing from the MFP 300 to the management server 400 is not also performed. When the XMPP connection is established, in step S2209, the management server 400 determines whether or not the job notification to the relevant MFP 300 is saved in the queue (S1108 in FIG. 5). In this example, since the job notification with respect to the relevant MFP 300 is saved in the queue (S1108 in FIG. 5: Yes), in step S2210, the management server 400 transmits the job notification to the MFP 300 that is to execute the printing job (S1109 in FIG. 5). When the MFP 300 receives the job notification (S1205 in FIG. 6: Yes), processing corresponding to the job notification reception event is performed, and in step S2211, the flag 323 is set (S1213 in FIG. 6). Subsequently, in step S2212, the MFP 300 transmits the job information request to the management server 400 (S1208 in FIG. 6). When the management server 400 receives the job information request (S1105 in FIG. 5: Yes), in step S2213, the printing job data spooled and saved in the hard disc unit 402 is transmitted to the MFP 300 (S1114 in FIG. 5). In this example, this is because the printing job with respect to the MFP 300 is saved in the queue (S1113 in FIG. 5: Yes). When the MFP 300 receives the job information (S1209 in FIG. 6: Yes), in step S2214, the execution of the printing job is performed (S1210 in FIG. 6). Since the processing of the printing job execution and the subsequent processing are similar to the sequence of FIG. 7, descriptions thereof will be omitted.

In this manner, according to the present exemplary embodiment, when the power supply of the MFP 300 is turned on while the job notification is saved in the queue of the management server 400, the job notification is transmitted from the management server 400 to the MFP 300. As a result, the job query is made from the MFP 300 to the management server 400, and the printing job is promptly executed. Specifically, when the job is generated, in other words, when the management server 400 receives the job, the information of the job notification is saved in the queue of the management server 400 that is not illustrated in the drawing. Subsequently, when the XMPP connection with the targeted MFP 300 that processes the job is established, the job notification is transmitted to the targeted MFP 300. Then, the MFP 300 that has received the job notification sets the flag, and in a case where the job corresponding to the job notification is executed, the flag is cleared. The MFP 300 determines whether or not the job information request is transmitted to the management server 400 depending on whether or not the flag is set. According to the present exemplary embodiment, when the power supply of the MFP 300 is turned on in a state in which the job notification is not performed from the management server 400 to the MFP 300, in a case where the management server 400 holds the unexecuted job, the MFP 300 can inquire the management server 400. On the other hand, in a case where the printing job is received by the management server 400 but the MFP 300 does not complete the execution of the printing job, the MFP 300 can request the management server 400 for the printing job. That is, in a case where the printing job that is to be processed by the MFP 300 does not exist, the MFP 300 does not inquire the management server 400. Specifically, since the MFP 300 executes the job query processing only when the job notification is received from the management server 400, the job query is not unnecessarily executed while the job does not exist in the management server 400. For example, when the power supply is turned on, in a case where the printing job that is to be processed by the MFP 300 does not exist, the MFP 300 does not inquire the management server 400. With this configuration, the communication traffic between the management server 400 and the MFP 300 can be alleviated, and the load of the management server 400 can also be alleviated.

Since the management server 400 and the MFP 300 are connected to each other via the internet 101, when the MFP 300 frequently transmits the job query to the management server 400, the communication overhead is large, and the traffic and the server load are increased. On the other hand, in a case where the job notification is transmitted from the management server 400 towards the MFP 300 when the job is input from the terminal device 200 and the MFP 300 transmits the job query to the management server 400 only when the job notification is received, the job may not be obtained in some cases. This is because, when the job is input while the MFP 300 is in the power supply off state, the job notification is not transmitted to the MFP 300. In contrast to this, according to the present exemplary embodiment, even when the job is input while the power supply is in the off state, the MFP 300 can be reliably transmitted to the job notification, and the communication traffic between the management server 400 and the MFP 300 and the load of the management server 400 can also be alleviated.

Other Exemplary Embodiments

The present invention is not limited to the above-described exemplary embodiment. For example, according to the above-described exemplary embodiment, the descriptions have been given while using the printing job as an example of the type of the job transmitted from the management server 400 to the MFP 300 functioning as the processing apparatus, but other types of the job may also be adopted. For example, the exemplary embodiment can also be applied to a case where an instruction of scanning using the MFP 300 is issued from the terminal device 200. In this case, information such as a scanning setting from the management server 400 or a transmission destination of read scanning data is relevant to the job (scanning job). Subsequently, an image obtained by reading the original by the scanner unit 315 is transmitted to the management server 400 as a result of the scanning job. Furthermore, the advantages of the present invention can also be attained while control is made such that printing and scanning are operated at the same time in parallel in response to both the notifications of the printing job and the scanning job.

In addition, according to the above-described exemplary embodiment, the descriptions have been given while using the case where the single processing apparatus is used as an example, but the number of processing apparatuses managed by the management server may be two or more, and an influence of the advantages of the present invention is increased as the number of processing apparatuses is increased.

Moreover, according to the above-described exemplary embodiment, the descriptions have been given while using the case where the management server 400 and the MFP 300 are connected to each other via the internet 101 as an example, but the advantages of the present invention can be attained even in a mode in which these devices are connected to each other via a local network.

According to the above-described exemplary embodiment, when the XMPP connection between the management server 400 and the MFP 300 is established, the management server 400 transmits the job notification to the MFP 300, but the connection for the job notification is not limited to the XMPP connection, and other protocols may also be used. The notification of the job may be performed in a case where the connection between the management server 400 and the MFP 300 is established by other techniques.

Furthermore, according to the above-described exemplary embodiment, the management server 400 receives the job from the terminal device 200, but the configuration is not limited to this, and the job may be obtained from other devices.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the exemplary embodiments of the present invention, the traffic between the server and the processing apparatus and the server lord can be alleviated.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-016486 filed Jan. 29, 2016, which is hereby incorporated by reference herein in its entirety.

What is claimed is:

1. A processing system comprising a server and a processing apparatus in communication with the server,
the server including
a first obtaining unit configured to obtain a job,
a first control unit configured to store the obtained job and job notification information corresponding to the job in a first memory,
a first notification unit configured to perform, in a case where a communication connection between the processing apparatus and the server is established, job notification using the job notification information stored in the first memory, and
a first transmission unit configured to transmit job information in accordance with a request on the job information, and
the processing apparatus including
a second reception unit configured to receive the job notification notified from the server,
a second control unit configured to store reception information indicating that the job notification is received in a second memory,
a determination unit configured to determine, in a case where a communication connection between the processing apparatus and the server is established, whether or not the reception information is stored in the second memory,
a request unit configured to request, in a case where the second reception unit receives the job notification, the server to transmit the job information, and
an execution unit configured to execute the job using the job information transmitted from the first transmission unit,
wherein the request unit requests the server to transmit the job information in a case where the determination unit determines that the reception information is stored, and
wherein, in a case where the execution unit completes executing the job, the second control unit restores the reception information related to the completed job in the second memory to an initial state.

2. The processing system according to claim 1, wherein the processing apparatus further includes a second notification unit configured to notify, in a case where the execution unit completes executing the job, the server of the job completion, and
wherein, in a case where the notification transmitted from the second notification unit is received, the first control unit deletes the job information related to the completed job in the first memory.

3. The processing system according to claim 1, wherein the server manages the job information and the job notification information executed for each processing apparatus.

4. The processing system according to claim 1, wherein the processing apparatus transmits a connection request to the server in a case where a power supply is turned on, and
wherein the processing apparatus and the server establish the communication connection in accordance with the connection request.

5. The processing system according to claim 1, wherein the processing apparatus has a printing function, and
wherein the job includes a printing job.

6. The processing system according to claim 1, wherein the processing apparatus has a scanner function, and
wherein the job includes a scanning job.

7. The processing system according to claim 1, wherein the server and the processing apparatus are connected to each other via the internet.

8. A control method for a processing system including a server and a processing apparatus in communication with the server, the control method comprising:
obtaining a job by the server;
storing the obtained job and job notification information corresponding to the job in a first memory of the server;
notifying, in a case where a communication connection between the server and the processing apparatus is established, the processing apparatus of the job notification using the job notification information stored in the first memory;
receiving the job notification transmitted from the server by the processing apparatus;
storing reception information indicating that the job notification is received in a second memory of the processing apparatus;
requesting, in a case where the job notification is received, the server to transmit job information;
transmitting the job information in accordance with the requesting; and
executing the job using the job information by the processing apparatus,
wherein, in a case where the communication connection between the processing apparatus and the server is established, the processing apparatus determines whether or not the reception information is stored in the second memory and requests the server to transmit the job information when it is determined that the reception information is stored, and wherein, in a case where the execution of the job is completed, the reception information related to the completed job in the second memory is restored to an initial state.

9. A processing apparatus in communication with a server, the processing apparatus comprising:

a reception unit configured to receive a job notification transmitted from the server;

a control unit configured to store reception information indicating that the job notification is received in a memory;

a request unit configured to request, in a case where the reception unit receives the job notification, the server to transmit job information; and an execution unit configured to execute the job using the job information transmitted from the server, wherein the request unit requests the server to transmit the job information in a case where the determination unit determines that the reception information is stored, and wherein the control unit restores, in a case where the execution unit completes executing the job, the reception information related to the completed job in the memory to an initial state.

10. The processing apparatus according to claim 9, further comprising a notification unit configured to notify, in a case where the execution unit completes executing the job, the server of the job completion.

11. A server in communication with a processing apparatus, the server comprising:

an obtaining unit configured to obtain a job;

a control unit configured to store the obtained job and job notification information corresponding to the job in a memory; and a transmission unit configured to transmit, in a case where a communication connection between the processing apparatus and the server is established, the job notification using the job notification information stored in the memory, wherein the transmission unit transmits job information in accordance with a request on the job, and wherein the control unit deletes, in a case where a job completion notification is received, the job information related to the completed job in the memory.

* * * * *